United States Patent
Lenzing et al.

(10) Patent No.: US 6,973,823 B2
(45) Date of Patent: Dec. 13, 2005

(54) DEVICE FOR DETERMINING AT LEAST ONE PARAMETER OF A MEDIUM FLOWING IN A LINE

(75) Inventors: Thomas Lenzing, Benningen (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 10/462,946

(22) Filed: Jun. 16, 2003

(65) Prior Publication Data

US 2004/0074291 A1 Apr. 22, 2004

(30) Foreign Application Priority Data

Jul. 5, 2002 (DE) .......................................... 102 30 531

(51) Int. Cl.[7] .................................................. G01F 1/86
(52) U.S. Cl. ...................................... 73/118.2; 73/202
(58) Field of Search ............................... 73/116, 117.2, 73/117.3, 118.1, 118.2, 119 R, 861.01, 202, 202.5

(56) References Cited

U.S. PATENT DOCUMENTS

| | | | |
|---|---|---|---|
| 5,537,870 A | 7/1996 | Zurek et al. | |
| 5,712,425 A | 1/1998 | Hecht et al. ................ | 73/118.2 |
| 5,948,975 A | 9/1999 | Mueller et al. ............. | 73/118.2 |
| 6,148,663 A | 11/2000 | Stahl et al. ................. | 73/118.2 |
| 6,272,920 B1 | 8/2001 | Tank et al. ................. | 73/204.22 |
| 6,345,531 B1 | 2/2002 | Mueller et al. ............ | 73/204.22 |
| 6,422,070 B2 | 7/2002 | Reymann et al. .......... | 73/118.2 |
| 6,557,408 B1 | 5/2003 | Mueller et al. ............. | 73/202.5 |
| 6,722,196 B2 | 4/2004 | Lenzing et al. ............ | 73/204.21 |
| 2001/0025526 A1 | 10/2001 | Reymann et al. .......... | 73/118.2 |
| 2003/0046977 A1 | 3/2003 | Lenzing et al. ............. | 73/23.32 |
| 2003/0089168 A1 | 5/2003 | Lenzing et al. ............. | 73/202.5 |
| 2003/0159501 A1 | 8/2003 | Renninger et al. ......... | 73/118.2 |

FOREIGN PATENT DOCUMENTS

| | | |
|---|---|---|
| DE | 196 23 334 | 12/1997 |
| DE | 198 15 654 | 10/1999 |
| EP | 1 164 360 | 12/2001 |
| WO | WO01 | 10/2001 |

*Primary Examiner*—Eric S. McCall
(74) *Attorney, Agent, or Firm*—Kenyon & Kenyon

(57) ABSTRACT

A device for determining at least one parameter of a medium flowing in a line, in particular the intake air mass of an internal combustion engine, has a part provided for introducing into the line, having at least one measuring channel for conducting at least one subflow of the medium flowing in the line, and having at least one measuring element situated in the measuring channel for determining the at least one parameter, in which the part may be introduced into the line with a predetermined orientation with respect to the medium flowing in the line in the main flow direction. A channel structure is formed in the part, the channel structure having an inlet area for the entry of a substream of the medium into the channel structure as well as at least one measuring channel branching off from the inlet channel, the measuring channel having an outlet opening that opens toward the outside of the part, the inlet area having a discharge zone that has a discharge orifice on a first lateral wall of the part, which opens toward the environment, and the discharge zone is closed on one second lateral wall diametrically opposite the first lateral wall.

10 Claims, 1 Drawing Sheet

DEVICE FOR DETERMINING AT LEAST ONE PARAMETER OF A MEDIUM FLOWING IN A LINE

BACKGROUND INFORMATION

Figure 1:
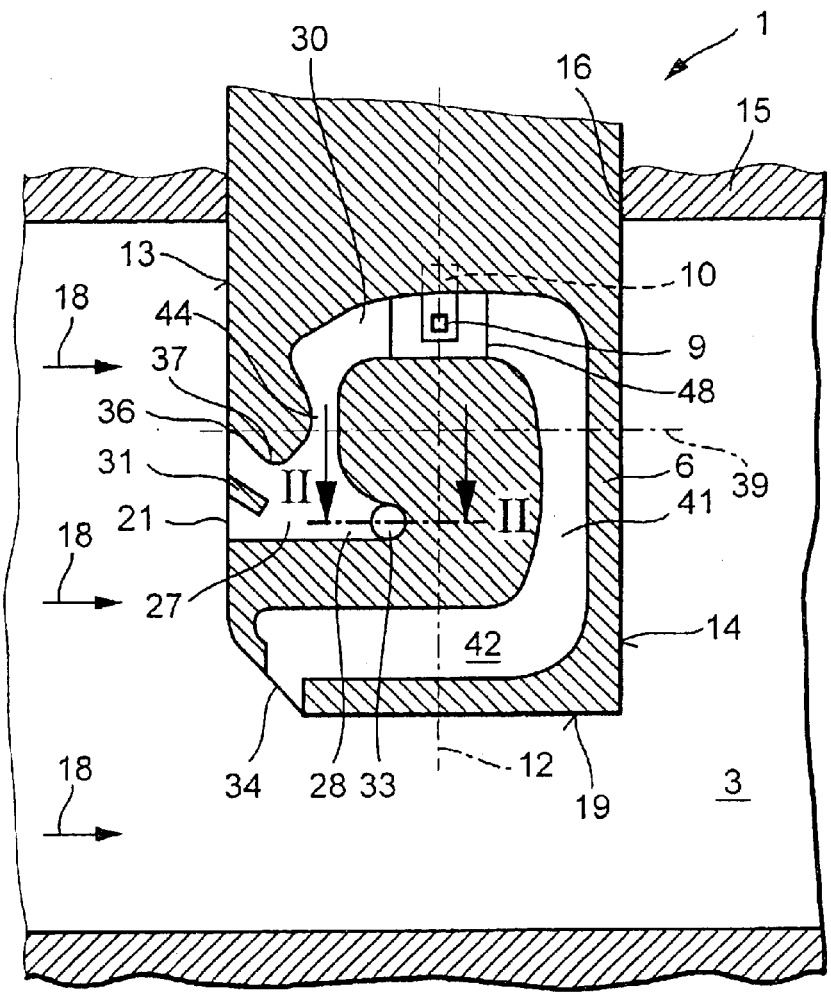

The present invention relates to a pressure measuring device having the features of the preamble of independent claim 1.

A device for determining the mass of a medium flowing in a line is known from German Patent Application No. 196 23 334A1, which has a part introduced into the line, in which a channel structure having a measuring channel is provided, in which a measuring element is situated. Liquid or solid particles in the medium that penetrate into the channel structure flow past the measuring element and may contaminate and damage the measuring element. Only after passing through the measuring element do the liquid or solid particles flow back into the line through an outlet opening of the measuring channel.

ADVANTAGES OF THE INVENTION

The pressure measuring device according to the present invention, having the characterizing features of claim 1, has the advantage over the related art that, in a simple manner, liquid and/or solid particles are prevented from reaching the measuring channel and contaminating or damaging the measuring element situated there. It is advantageous to divide the medium flowing into the channel structure into two substreams in an inlet area of the channel structure, liquid or solid particles that flow into the channel structure being deviated from the measuring channel, entering a discharge zone of the inlet area. The discharge zone has a lateral discharge orifice on a first lateral wall and is closed on the diametrically opposite second lateral wall, thus reducing the free flow surface and advantageously increasing the average flow rate toward the discharge orifice.

An advantageous exemplary embodiments and refinements of the present invention are made possible by the features indicated in the dependent claims.

An advantageous exemplary embodiment provides for the inner wall of the discharge zone, facing the one discharge orifice, to be curved and to aerodynamically control and deviate the flow toward the one outlet opening. The inner wall in the discharge zone is preferably concavely curved, as viewed in the main flow direction. Because of the controlled deviation, water and or solid particles that have entered the inlet area are separated relatively quickly from the discharge zone by the discharge orifice.

DRAWINGS

Exemplary embodiments of the present invention are illustrated in the drawing and will be explained in the subsequent description.

Figure 2:
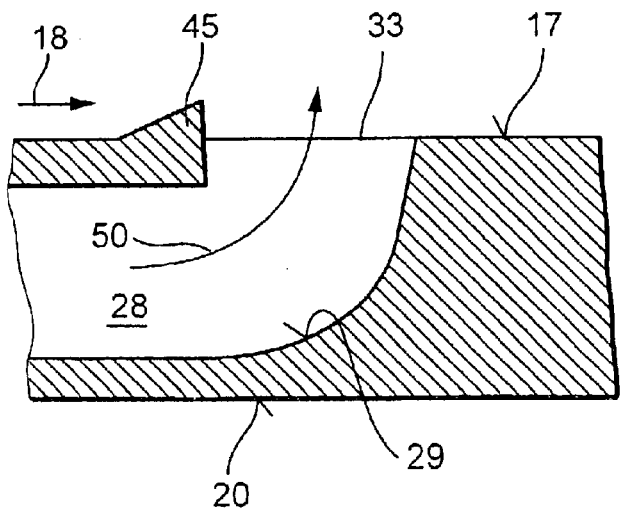

FIG. 1 shows an exemplary embodiment of the device according to the present invention, in the mounted state on a line, FIG. 2 shows an enlarged cross-section of a detail of FIG. 1.

DESCRIPTION OF AN EXEMPLARY EMBODIMENT

FIG. 1 shows a line 3 in which a medium flows in a main flow direction 18. The line may be an intake pipe of an internal combustion engine, for example. The medium is the air flowing in the intake pipe, for example. A device 1 according to the present invention is situated on line 3 in such a way that a part 6 of the device is introduced into line 3 and is exposed to the medium flowing there with a predetermined orientation. Aside from part 6 designed as a measuring casing, device 1 for determining at least one parameter of the medium also includes a support part, not illustrated further, having an electrical terminal, with an electronic analyzer unit, for example, being mounted in the support part. Part 6 of device 1 may be inserted, for example, through an insertion opening 16 of a wall 15 of line 3, wall 15 delimiting a flow cross section of line 3. The electronic analyzer unit may be situated within and/or outside the flow cross section of line 3.

For example, a measuring element 9 on a measuring element support 10 is used in device 1, the measuring element determining the volume flow or mass flow of the flowing medium as the parameter, for example. Other parameters that may be measured are, for example, pressure, temperature, concentration of a medium component or flow velocity, which are determined using suitable sensor elements.

Device 1 has, for example, a longitudinal axis 12 in the axial direction, which runs into line 3 in the direction of insertion of device 1, for example, and which may also be the center axis, for instance. The direction of the flowing medium, referred to in the following as the main flow direction, is identified by a corresponding arrow 18 in FIG. 1 and runs from left to right in this case. The insertion of part 6 ensures that part 6 has a predetermined orientation with respect to the main flow direction of the medium.

Part 6 has a casing having a block-shaped structure, for example, having a front wall 13 facing main flow direction 18 of the medium in the inserted position and a back wall 14 opposite thereto, a first lateral wall 17 and a second lateral wall 18 (FIG. 2) and a third lateral wall 19 running parallel to the main flow direction, for example. Furthermore, part 6 has a channel structure situated therein, having an inlet area 27 and a measuring channel 30 branching off from inlet area 27. By positioning device 1 relative to line 3, it is ensured that the medium flowing in main flow direction 18 strikes part 6 in a predetermined direction and a substream of the medium in this direction enters inlet area 27 through an opening 21. Opening 21 may be oriented perpendicular to main flow direction 18, for example, but a different orientation of opening 21 to main flow direction 18 is also conceivable. From inlet area 27, a portion of the medium enters measuring channel 30 provided with measuring element 9, and another portion flows further into a discharge zone 28 downstream from branching point 44 for the measuring channel, the discharge zone being connected to line 3 via a discharge orifice 33 situated in first lateral wall 17. In the exemplary embodiment shown in FIG. 1, main flow direction 18 runs in a plane, in which discharge orifice 33 is also situated. The plane in which discharge orifice 33 is situated may also be situated at an angle different from zero degrees to main flow direction 18.

A first substream of the medium that has entered inlet area 27 flows entirely into measuring channel 30 and a second substream flows entirely through the one discharge orifice 33. The flowing medium contains, for example, liquid and/or solid particles, such as oil or water particles, which may contaminate or damage measuring element 9. The liquid or solid particles may flow back again into line 3 through discharge orifice 33, as will be explained in greater detail.

Opening 21 on front wall 13 of part 6 has an upper edge 36 in axial direction 12, the upper edge being closest to measuring element 9 in axial direction 12. An upper imaginary plane 39 runs through upper edge 36 as well as perpendicular to the plane of the drawing in FIG. 1 and parallel to main flow direction 18. Discharge orifice 33 is situated in axial direction 12 beneath this upper plane 39. The channel structure of part 6 may furthermore have a projection 37 engaging into inlet area 27, the projection being designed in such a way that the medium flowing into the inlet area is deviated from upper plane 39. Since the liquid and/or solid particles are larger, and have greater density than the gaseous flowing medium, they move in axial direction 12 away from upper plane 39. Since discharge orifice 33 is situated beneath upper plane 39, the liquid and solid particles accumulate in discharge zone 28 and are aspirated out into line 3 by the air flowing past discharge orifice 33. In addition, a separating wall 31 may be situated in inlet area 27, the separating wall extending from opening 21 or also downstream from opening 21 at least partially into inlet area 27. Separating wall 31, which is designed wafer-shaped, for example, forms an angle of intersection different from zero degrees with main flow direction 18. By placing separating wall 31 crosswise to the flowing medium, the medium flowing into inlet area 27 is intentionally deviated from branching point 44 of measuring channel 30 and directed toward discharge zone 28. Thus, fluid or solid particles may be prevented to an even higher degree from entering measuring channel 30.

Starting from inlet area 27, a first section of measuring channel 30 extends in axial direction 12 toward insertion opening 16. In this section, downstream from branching point 44, there is a first tapering of measuring channel 30, which causes an acceleration of the flowing medium, as a result of which the air is aspirated from inlet area 27. Downstream from the first tapering, the flowing medium is deviated into measuring channel 30 and then flows past measuring element 9 in main flow direction 18, for example. There may be a second tapering 48 of measuring channel 30 in the region of measuring element 9, for example. The first or second tapering may be in the form of narrowing of the lateral faces of measuring channel 30 on some or all sides. From measuring element 9, the medium flows further and is deviated into a section 41, which extends in axial direction 12 away from insertion opening 16. From this section, it is deviated into another section 42, which runs against main flow direction 18, for example, and at an outlet opening 34, which is situated perpendicular to main flow direction 18 or at an angle different from zero degrees to main flow direction 18, it flows into line 3. Measuring channel 30 is therefore C-shaped in this exemplary embodiment, for example, in which the opening of the C-shape faces main flow direction 18.

FIG. 2 shows a section along Line IV—IV through discharge zone 28 of FIG. 1. As described above, liquid and/or solid particles that have entered inlet area 27 enter discharge zone 28. A discharge orifice is produced in a first lateral wall 17. Second lateral wall 20 opposite the first lateral wall does not have any opening. Because the discharge zone has only a single lateral discharge orifice on the first lateral wall and is closed on the diametrically opposed second lateral wall, the average flow velocity in direction of discharge orifice 33 is relatively high, due to the flow area, which is kept small, in the discharge zone. For this reason, two diametrically opposed discharge orifices are not provided in discharge zone 28, for example.

Inner wall 29 of discharge zone 28, facing the one discharge orifice 33, is closed and may advantageously aerodynamically control and deviate the flow in the direction of arrow 50 in FIG. 2 toward the one outlet opening. For this purpose, inner wall 29 facing the one discharge orifice 33 is curved toward discharge orifice 33. Inner wall 29 is preferably concavely curved in discharge zone 28 as viewed in main flow direction 18. Water and/or solid particles that have entered inlet area 27 are relatively quickly removed in this manner from the discharge zone toward the discharge orifice and discarded into line 3.

In addition, by establishing a suction effect, water and/or solid particles are suctioned out of discharge zone 28 to a higher degree. This happens, among other things, because at least one projection 45 is provided on the outside of first lateral wall 17 of part 6 upstream of discharge orifice 33. The outer surface of projection 45 may be streamlined or curved, for example. Projection 45 is provided in the region of discharge orifice 33 such that a partial vacuum region (detachment) is created, and consequently, there is a suction effect on the flow in discharge zone 28 of inlet area 27.

What is claimed is:

1. a device for determining at least one parameter of a medium flowing in a line (3), in particular the intake air mass of an internal combustion engine, having a part (6) provided for permitting introduction into the line, the part having at least one measuring channel (30) for conducting through at least one substream of the medium flowing in the line, and having at least one measuring element (9) situated in the measuring channel for determining the at least one parameter, the part (6) being insertable into the (3) in an axial direction (12) with a predetermined orientation with respect to the medium flowing in the line in a main flow direction (18) and a channel structure being formed in the part (6) which has an inlet area (27) having an orifice (21) to permit entry of a substream of the medium into the channel structure as well as at least one measuring channel (30) branching off from the inlet area, the measuring channel having an outlet orifice (34) opening toward the outside of the part (6), wherein the orifice (21) has an upper restriction (36) lying closest to the measuring element (9) in the axial direction (12) through which restriction (36) a plane runs parallel to the main flow direction (18) and perpendicular to the axial direction (12), and the inlet area (27) has a discharge zone (28) which, on a first lateral wall (17) of the part, has a discharge orifice (33) that opens toward the ambient environment and is closed on a second lateral wall (20) diametrically opposite the first lateral wall, the discharge orifice (33) being situated with regard to the axial direction (12) on a side of the plane (39) on which the measuring element (9) is not situated, and the channel structure having a projection (37) protruding into the inlet area, at which the medium entering the inlet area is diverted away from the plane (39).

2. The device according to claim 1, wherein the at least one parameter of the medium flowing in the line includes an intake air mass of an internal combustion engine.

3. The device according to claim 1, wherein, viewed in the main flow direction, the discharge zone is situated downstream from a branching point where the measuring channel branches off from the inlet area.

4. The device according to claim 1, wherein the part includes at least one front wall, and wherein the front wall, in a position in which the part is introduced into the line, faces the medium flowing in the line in the main flow direction with a predetermined orientation, the inlet area extending from the front wall into an interior of the part up to the discharge orifice.

5. The device according to claim 1, wherein the first lateral wall runs substantially parallel to the main flow direction.

6. The device according to claim 4, wherein a plane of the discharge orifice runs substantially perpendicular to the front wall.

7. The device according to claim 4, further comprising at least one projection situated on the first lateral wall, upstream from the discharge orifice.

8. The device according to claim 1, wherein the discharge zone of the inlet area, viewed in the main flow direction, has a shape curving toward the discharge orifice situated in the first lateral wall.

9. The device according to claim 1, wherein an inner wall of the discharge zone, diametrically opposite the discharge orifice, is curved toward the discharge orifice in such a way as to enable the flow to be deviated toward the lateral discharge orifice by the curved inner wall in the discharge zone.

10. The device according to claim 9, wherein the inner wall of the discharge zone, diametrically opposed to the discharge orifice, is concavely curved, viewed in the main flow direction.

* * * * *

UNITED STATES PATENT AND TRADEMARK OFFICE
CERTIFICATE OF CORRECTION

| | | |
|---|---|---|
| PATENT NO. | : 6,973,823 B2 | Page 1 of 1 |
| APPLICATION NO. | : 10/462946 | |
| DATED | : December 13, 2005 | |
| INVENTOR(S) | : Lenzing et al. | |

It is certified that error appears in the above-identified patent and that said Letters Patent is hereby corrected as shown below:

Column 1, lines 8-9, change "devices having the features of the preamble of independent claim 1." to --devices.--

Column 1, line 13, change "23 334 A1" to --23 334--

Column 1, line 22, change "ADVANTAGES OF THE INVENTION" to --SUMMARY OF THE INVENTION--

Column 1, lines 24-25, change "invention, having the characterizing features of claim 1, has" to --invention has--

Column 1, lines 39-41, remove "An advantageous… the dependent claims."

Column 1, line 53, change "DRAWINGS" to --BRIEF DESCRIPTION OF THE DRAWINGS--

Column 1, lines 63-64, change "DESCRIPTION OF AN EXEMPLARY EMBODIMENT" to -- DETAILED DESCRIPTION--

Column 4, line 28, change "into the (3)" to --into the line (3)--

Signed and Sealed this

Thirteenth Day of February, 2007

JON W. DUDAS
*Director of the United States Patent and Trademark Office*